US012259027B2

(12) United States Patent
Lee (10) Patent No.: US 12,259,027 B2
(45) Date of Patent: Mar. 25, 2025

(54) BALL NUT ASSEMBLY AND END COMPONENT THEREOF

(71) Applicant: ChuanYu Lee, New Taipei (TW)

(72) Inventor: ChuanYu Lee, New Taipei (TW)

( * ) Notice: Subject to any disclaimer, the term of this patent is extended or adjusted under 35 U.S.C. 154(b) by 0 days.

(21) Appl. No.: 18/331,522

(22) Filed: Jun. 8, 2023

(65) Prior Publication Data

US 2024/0125376 A1   Apr. 18, 2024

(30) Foreign Application Priority Data

Oct. 18, 2022   (CN) .......................... 202222742378.1

(51) Int. Cl.
*F16H 25/20* (2006.01)
*F16H 25/22* (2006.01)
*F16H 25/24* (2006.01)

(52) U.S. Cl.
CPC ..... *F16H 25/2214* (2013.01); *F16H 25/2418* (2013.01)

(58) Field of Classification Search
CPC ............. F16H 25/2214; F16H 25/2418; F16H 25/2219; F16H 25/2247; F16H 25/2228; F16H 2025/228; F16H 25/22
See application file for complete search history.

(56) References Cited

U.S. PATENT DOCUMENTS

| 7,631,572 B2* | 12/2009 | Fujita | B62D 5/0448 384/43 |
| 8,146,453 B2* | 4/2012 | Uesugi | F16H 25/2247 384/522 |
| 8,261,627 B2* | 9/2012 | Miyahara | F16H 25/2219 74/424.82 |
| 2007/0261511 A1* | 11/2007 | Ho | F16H 63/32 74/523 |
| 2010/0180707 A1 | 7/2010 | Wu | |
| 2014/0013887 A1 | 1/2014 | Chang et al. | |
| 2019/0195325 A1* | 6/2019 | Kaibe | F16H 25/2219 |

(Continued)

FOREIGN PATENT DOCUMENTS

| CN | 214499938 U | 10/2021 | |
| CN | 113847407 A * | 12/2021 | ......... F16H 57/0025 |
| CN | 114270079 A * | 4/2022 | ............. B60K 17/02 |

(Continued)

*Primary Examiner* — Zakaria Elahmadi (74) *Attorney, Agent, or Firm* — INNOVATION CAPITAL LAW GROUP, LLP; Vic Lin (57) ABSTRACT

A ball nut assembly and an end component thereof are provided. The ball nut assembly includes a nut body and an end component. The nut body includes an outer ring wall, a ball groove, an assembling groove, and a fixing hole. The assembling groove is arranged on an end portion, and the assembling groove has a first side surface, a second side surface, and a bottom surface. The end component is accommodated in the assembling groove of the nut body, and includes a first contact surface, a second contact surface, a radial surface, a fixing portion, and a reflow bend. The fixing portion is arranged on the radial surface. The first and second contact surfaces contact the first and second side surfaces of the assembling groove in a force-fit manner, respectively, and two ends of the reflow bend respectively correspond to the ball groove and the reflow channel.

12 Claims, 7 Drawing Sheets

(56) References Cited

U.S. PATENT DOCUMENTS

2020/0240504 A1* 7/2020 Lebang .................. B23F 19/10
2020/0240517 A1* 7/2020 Lebang .............. F16H 63/3013

FOREIGN PATENT DOCUMENTS

| DE | 102018131064 A1 * | 6/2019 | ......... F16H 25/2214 |
|----|---|---|---|
| DE | 112017007853 T5 | 4/2020 | |
| EP | 1867899 A1 * | 12/2007 | ............. F16H 63/32 |
| KR | 20070070247 A | 7/2007 | |
| KR | 20200012200 A | 2/2020 | |
| WO | WO-2006046636 A1 * | 5/2006 | ......... F16H 25/2214 |
| WO | WO-2016051434 A1 * | 4/2016 | ......... F16H 25/2219 |
| WO | WO-2019230976 A1 * | 12/2019 | ......... F16H 25/2214 |

* cited by examiner

BALL NUT ASSEMBLY AND END COMPONENT THEREOF

CROSS-REFERENCE TO RELATED APPLICATION

This non-provisional application claims priority under 35 U.S.C. § 119(a) to Patent Application No. 202222742378.1 filed in China, P.R.C. on Oct. 18, 2022, the entire contents of which are hereby incorporated by reference.

BACKGROUND

Technical Field

The instant disclosure relates to a ball nut assembly an end component applied to the ball nut assembly.

Related Art

Generally, in order to assemble a ball circulator, a groove will be provided on a nut. However, such an open groove will result in a low rigidity of the nut and is susceptible to noise. Further, in order to cooperate with the groove, a flange surface cannot be designed to be flush with a surface of the nut. As a result, when the ball circulator is impacted, the ball circulator may be damaged more easily. In addition, if a length of a guide portion of the ball circulator is longer, issue of clogging of balls might occur easily, resulting that the balls cannot roll smoothly.

SUMMARY

In view of this, according to one embodiment, a ball nut assembly is provided and comprises a nut body and an end component. The nut body comprises an outer ring wall, an inner ring wall, a ball groove, a reflow channel, an assembling groove, and a fixing hole. The ball groove is annularly arranged on the inner ring wall. The reflow channel is axially defined through the nut body between the outer ring wall and the inner ring wall. The assembling groove is arranged on an end portion, and the assembling groove has a first side surface, a second side surface, a bottom surface, and an assembling groove wall. The first side surface and the second side surface are opposite to each other. The bottom surface is connected to the first side surface and the second side surface, and the fixing hole is on the bottom surface. The assembling groove wall is adjacent to the first side surface, the second side surface, and the bottom surface, and a surface of the assembling groove wall is flushed with a surface of the outer ring wall. The end component is accommodated in the assembling groove of the nut body. The end component comprises a first contact surface, a second contact surface, a radial surface, a fixing portion, and a reflow bend. The first contact surface is opposite to the second contact surface. The radial surface extends radially and is connected to the first contact surface and the second contact surface. The fixing portion is arranged on the radial surface. The reflow bend is arranged on the second contact surface. The first contact surface contacts the first side surface of the assembling groove in a force-fit manner. The second contact surface contacts the second side surface of the assembling groove in the force-fit manner. Two ends of the reflow bend respectively correspond to the ball groove and the reflow channel, and the fixing portion is fixed in the fixing hole.

In some embodiments, the nut body further comprises a flange radially extending from one end of the nut body.

In some embodiments, the ball nut assembly further comprises a dustproof sheet. The dustproof sheet has a convex portion, the nut body has a hollow portion, the dustproof sheet is assembled in the hollow portion, and the convex portion correspondingly covers the assembling groove.

In some embodiments, a thickness between the assembling groove wall and the outer ring wall is at least 2 mm.

In some embodiments, the ball nut assembly further comprises a shaft inserted into the nut body.

In some embodiments, the ball nut assembly further comprises a plurality of balls rolling in a ball circulation channel formed by the ball groove, an outer wall of the shaft, the reflow bend, and the reflow channel.

In some embodiments, the reflow bend has a first end and a second end, and a rollable distance from the first end to the second end is 2 to 3 times a diameter of one of the balls.

In some embodiments, the end component further comprises an axial surface. The axial surface axially extends and is connected to the first contact surface and the second contact surface, the first contact surface has a first fillet portion, and a second fillet portion is between the second contact surface and the axial surface.

In some embodiments, a radius of the first fillet portion is 0.8 to 1.8 times a diameter of one of the balls.

In some embodiments, the nut body has an axial center, a line connecting the second fillet portion and the axial center forms a reference axis, and an angle between a virtual extension line of the second contact surface and the reference axis is between 40 and 50 degrees.

Moreover, according to another embodiment, an end component is provided. The end component is adapted to be assembled on a nut so as to allow a plurality of balls rolling thereon. The end component comprises a first contact surface, a second contact surface, a radial surface, a fixing portion, and a reflow bend. The second contact surface is opposite to the first contact surface. The radial surface radially extends and is connected to the first contact surface and the second contact surface. The fixing portion is arranged on the radial surface. The reflow bend is arranged on the second contact surface.

In some embodiments, the end component further has an arc surface. The arc surface is opposite to the axial surface and is connected to the first contact surface and the second contact surface. A line connecting to the second fillet portion and a center of circle of the arc surface forms a reference axis, and an angle between a virtual extension line of the second contact surface and the reference axis is between 40 and 50 degrees.

As above, according to one or some embodiments of the instant disclosure, a ball nut assembly or an end component thereof are provided. By arranging the assembling groove wall on the assembling groove to increase the thickness of the nut body, the strength and service life of the nut body are improved, and the impact of noise on the ball nut assembly is also reduced. Further, in some embodiments, the flange radially extends from the end portion of the nut body. In this way, the surface of the flange is flushed with the end surface of the nut body, so that an assembling plane having a maximized surface area can be maintained during the assembling process. In addition, by shortening a guide length of the end component, the issues of balls clogging can be avoided.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
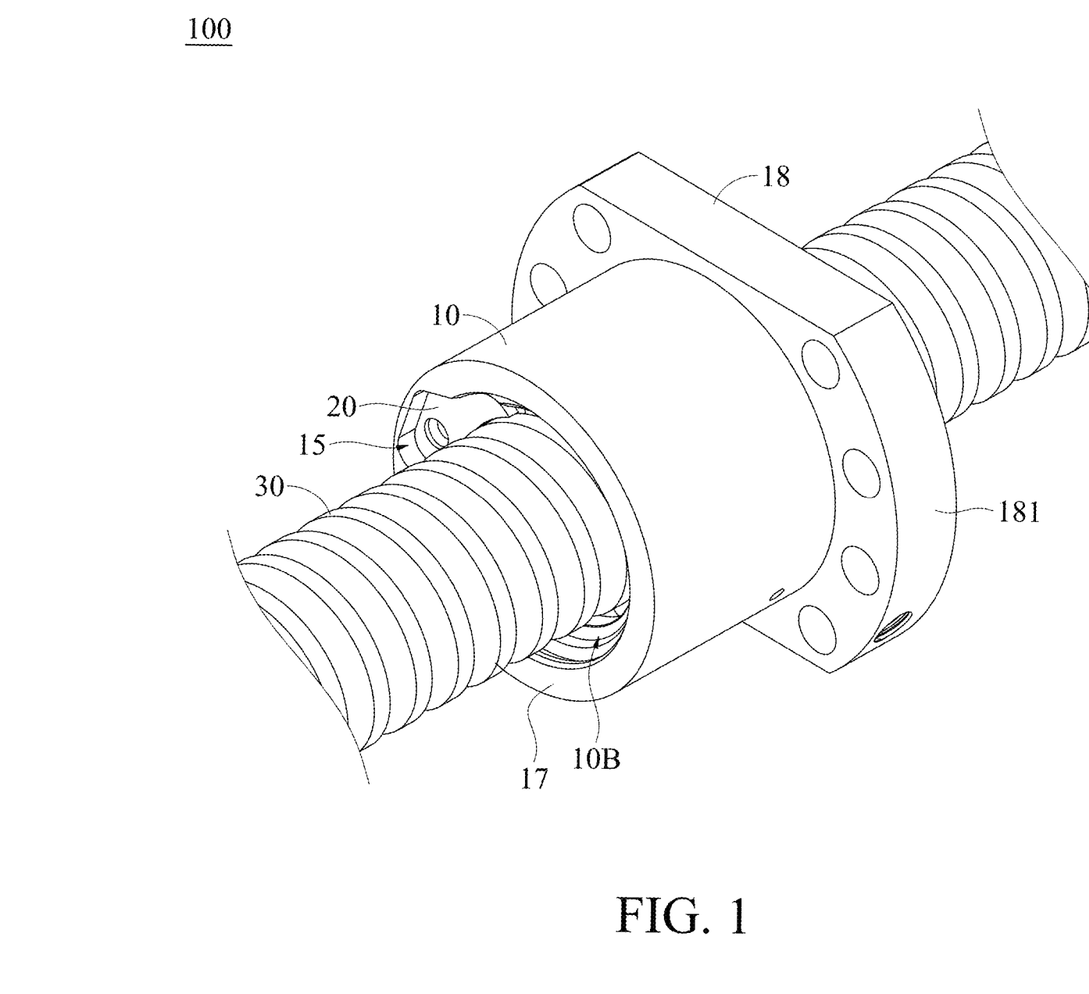
FIG. 1 illustrates a perspective view of a ball nut assembly according to an embodiment of the instant disclosure.
Figure 2:
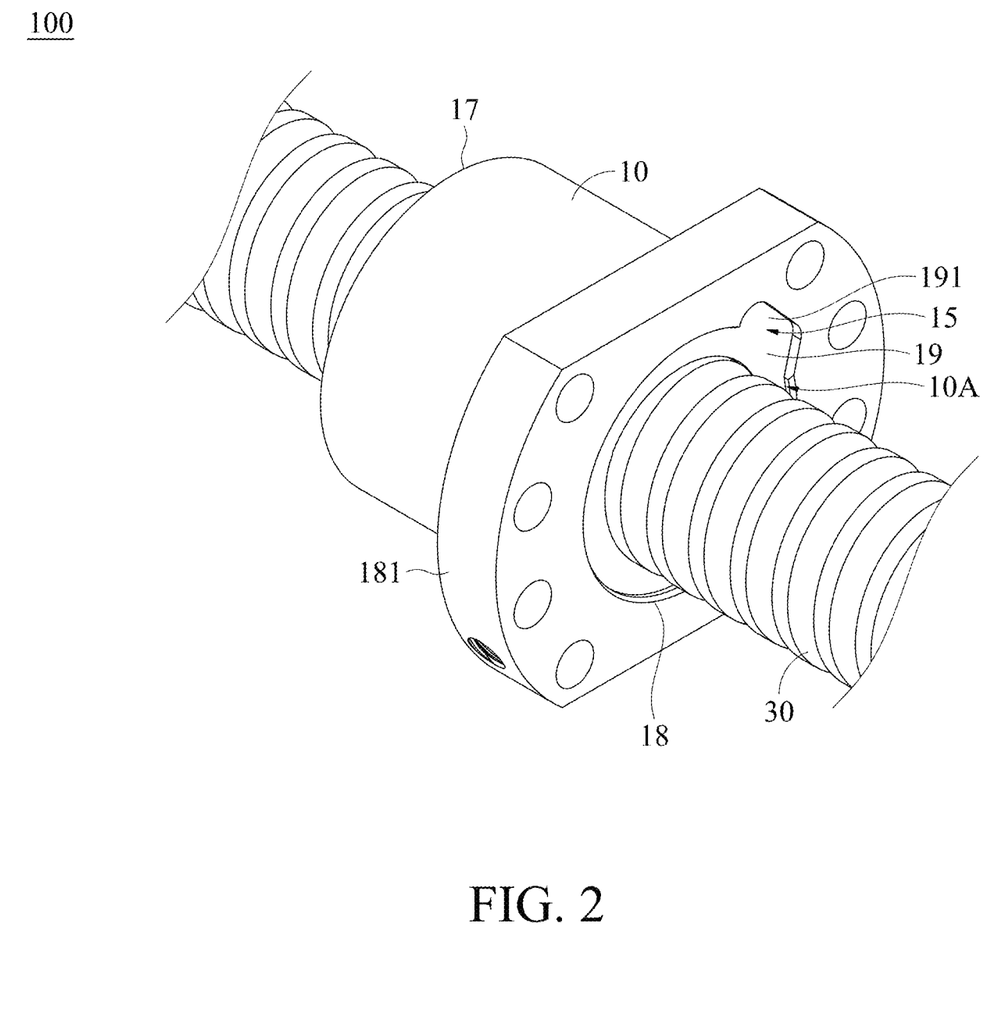
FIG. 2 illustrates a perspective view of a ball nut assembly according to an embodiment of the instant disclosure from another perspective.
Figure 3:
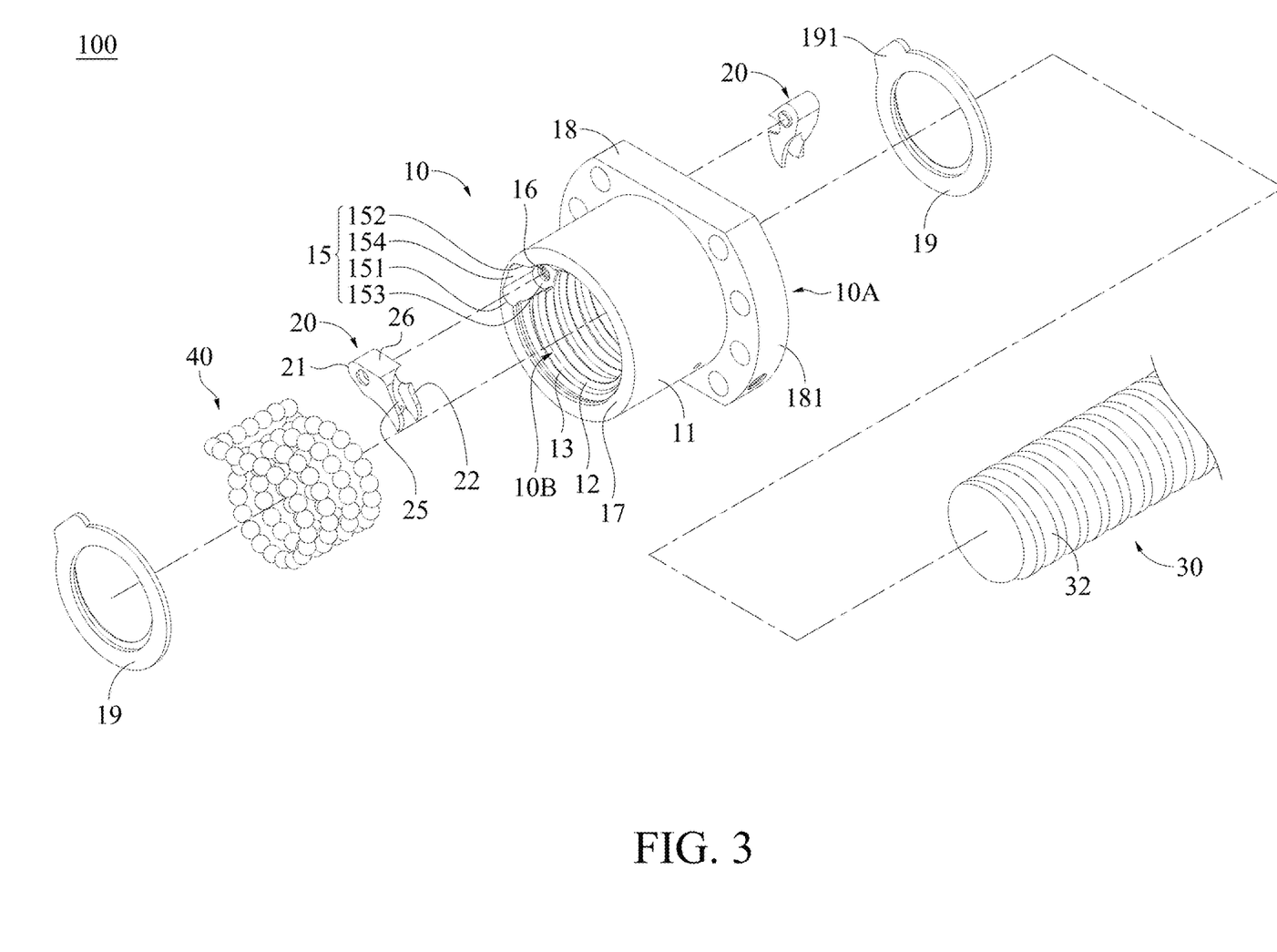
FIG. 3 illustrates an exploded view of a ball nut assembly according to an embodiment of the instant disclosure.
Figure 4:
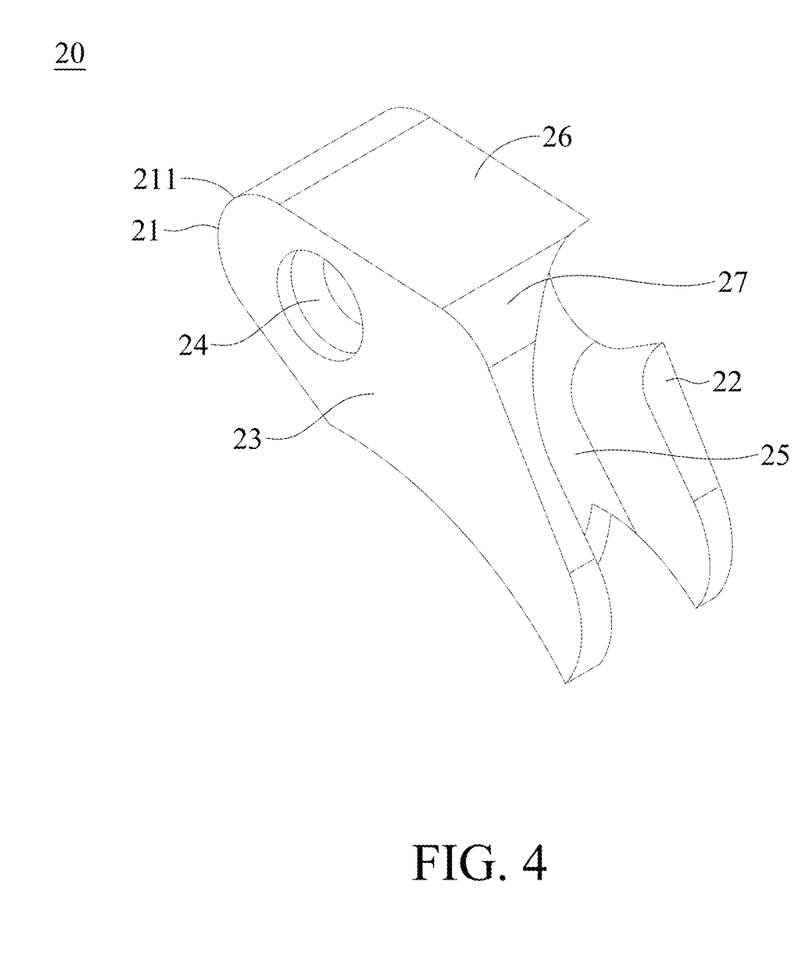
FIG. 4 illustrates a perspective view of an end component according to an embodiment of the instant disclosure.
Figure 5:
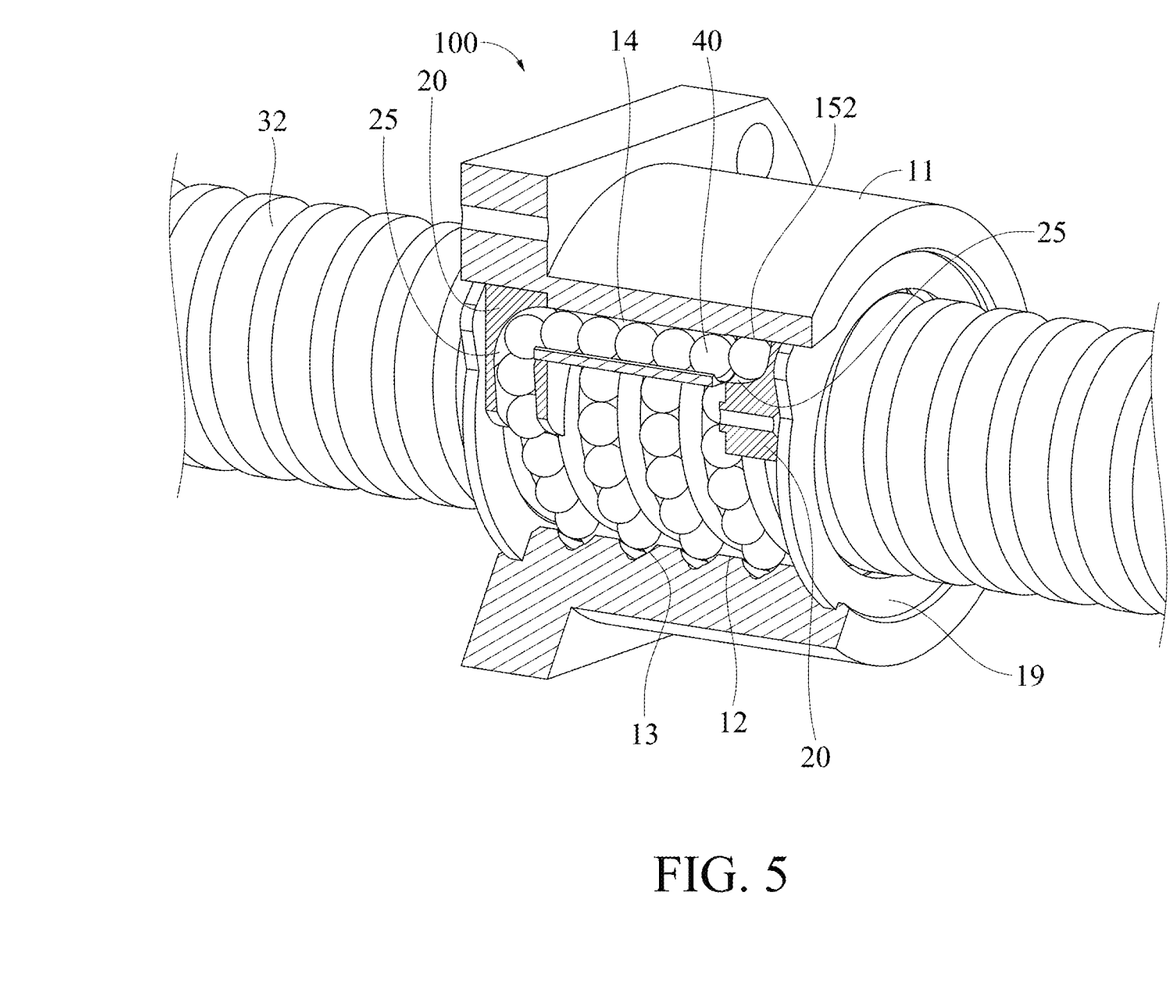
FIG. 5 illustrates a partial cross-sectional view of a ball nut assembly according to an embodiment of the instant disclosure.

Please refer to FIG. 1 to FIG. 5. FIG. 1 illustrates a perspective view of a ball nut assembly according to an embodiment of the instant disclosure. FIG. 2 illustrates a perspective view of a ball nut assembly according to an embodiment of the instant disclosure from another perspective. FIG. 3 illustrates an exploded view of a ball nut assembly according to an embodiment of the instant disclosure. FIG. 4 illustrates a perspective view of an end component according to an embodiment of the instant disclosure. FIG. 5 illustrates a partial cross-sectional view of a ball nut assembly according to an embodiment of the instant disclosure. For the sake of clarity in describing the instant disclosure, as compared with the embodiment shown in FIG. 3, in FIG. 1, the dustproof sheet 19 on one side is omitted.

A ball nut assembly 100 is adapted to allow a plurality of balls rolling thereon. The ball nut assembly 100 includes a nut body (nut) 10 and two end components 20. In this embodiment, the ball nut assembly 100 further includes a shaft 30 inserted into the nut body 10. As shown in FIG. 3, the two end components 20 are assembled on two ends of nut body 10, respectively. In this embodiment, although two end components 20 are provided as an example for illustration, only one end component 20 may be provided in other embodiments. Further, since the two end components 20 have the same structure and are assembled symmetrically on the nut body 10, only the end component 20 on one side will be described below, and descriptions for the end component 20 on the other side will not be repeated.

The nut body 10 includes an outer ring wall 11, an inner ring wall 12, a ball groove 13, a reflow channel 14, two assembling grooves 15, a fixing hole 16, a first end portion 17, and a second end portion 18, where the first end portion 17 and the second end portion 18 axially correspond to each other. The ball groove 13 is annularly arranged on the inner ring wall 12. The reflow channel 14 is axially defined through the nut body 10 between the outer ring wall 11 and the inner ring wall 12. The two assembling grooves 15 are arranged on the first end portion 17 and the second end portion 18 of nut body 10, respectively. In this embodiment, since each of the first end portion 17 and the second end portion 18 of the nut body 10 is provided with an assembling groove 15, two end components 20 are provided to be assembled in the two assembling grooves 15, respectively. In other embodiments, only one assembling groove 15 may be arranged on the first end portion 17 or the second end portion 18 of the nut body 10, and one end component 20 may be assembled to the assembling groove 15. In addition, the first end portion 17 and the second end portion 18 may have different implementations, and different structures of the first end portion 17 and the second end portion 18 will be described in detail later.

As shown in FIG. 1 and FIG. 3, the assembling groove 15 has a first side surface 151, a second side surface 152, a bottom surface 153, and an assembling groove wall 154. The first side surface 151 and the second side surface 152 are opposite to each other. The bottom surface 153 is connected to the first side surface 151 and the second side surface 152. The fixing hole 16 is on the bottom surface 153. The assembling groove wall 154 is adjacent to the first side surface 151, the second side surface 152, and the bottom surface 153, and a surface of the assembling groove wall 154 is flushed with a surface of the outer ring wall 11. As shown in FIG. 1 and FIG. 3, the first side surface 151 is formed on portion of one side of the inner ring wall 12; likewise, the second side surface 152 is also formed on the portion of the side of the inner ring wall 12. The bottom surface 153 is formed on the side of the inner ring wall 12 along the radial direction. In this way, the assembling groove can be prevented from being directly exposed to the nut body 10. In this embodiment, a thickness between the assembling groove wall 154 and the outer ring wall 11 is at least 2 mm.

Please refer to FIG. 1 to FIG. 4, the two end components 20 are applied in the ball nut assembly 100, and the two end components 20 are respectively assembled in the two assembling grooves 15 of the nut body 10. As shown in FIG. 3 and FIG. 4, each of the end components 20 includes a first contact surface 21, a second contact surface 22, a radial surface 23, a fixing portion 24, and a reflow bend 25. The second contact surface 22 is opposite to the first contact surface 21. The radial surface 23 extends radially and is connected to the first contact surface 21 and the second contact surface 22. The fixing portion 24 is arranged on the radial surface 23. the reflow bend 25 is arranged on the second contact surface 22, and the reflow bend 25 formed as a groove in the end component 20, the groove interconnecting the two ends of the reflow bend 25 and an entirety of the groove being open to an exterior of the end component 20.

When the end component 20 is assembled in the assembling groove 15 in the way shown in FIG. 1, please also refer to FIG. 1, FIG. 3, and FIG. 4. the fixing portion 24 is correspondingly fixed in the fixing hole 16. The first contact surface 21 contacts the first side surface 151 of the assembling groove 15 in a force-fit manner. The second contact surface 22 contacts the second side surface 152 of the assembling groove 15 in the force-fit manner. As shown in FIG. 5, the reflow bend 25 is open towards the second side surface 152, and two ends of the reflow bend 25 respectively correspond to the ball groove 13 and the reflow channel 14. In this embodiment, the fixing hole 16 is a screw hole, and the fixing portion 24 comprise for example a screw and a through hole, and the end component 20 is assembled in the assembling groove 15 in a screw locking manner.

Next, please refer to FIG. 1, FIG. 3, and FIG. 5, the shaft 30 is axially inserted into the nut body 10. As shown in FIG. 5, a plurality of balls 40 rolls in a ball circulation channel formed by the ball groove 13, an outer wall of the shaft 30, the reflow bend 25, and the reflow channel 14. In this embodiment, the shaft 30 further includes a plurality of track grooves 32, and the balls 40 roll in the channel formed by the ball grooves 13 and the track grooves 32. In other embodiments, the shaft 30 does not necessarily have the track groove 32. For example, the shaft 30 is a round rod with a smooth surface, and the balls 40 roll in the channel formed between the ball groove 13 and the smooth surface of the shaft 30.

Specifically, according to one or some embodiments, the assembling groove 15 has the assembling groove wall 154, and because the assembling groove wall 154 has a certain thickness, rather than being exposed outward (formed as an open groove). In this way, the integrity, strength, and service life of the nut body 10 can be further improved. At the same time, such configuration also prevents the internal components of the ball nut assembly 100 from being exposed, thus reducing the impact of noise on the internal components of the ball nut assembly 100.

In this embodiment, the first end portion 17 and the second end portion 18 may have different implementations. As shown in FIG. 2, the nut body 10 further includes a flange 181, the flange 181 radially extending from the second end 18 of the nut body 10. That is to say, in this embodiment, the surface of the flange 181 is flushed with the surface of the second end portion 18 of the nut body 10. In this way, an assembling plane having a maximized surface area can be maintained during the assembling process. In this embodiment, the flange 181 is formed from the second end portion 18, but the instant disclosure is not limited thereto; in some embodiments, the flange 18 may also be formed on the first end portion 17.

In this embodiment, the ball nut assembly 100 further includes two dustproof sheets 19. Each of the dustproof sheets 19 has a convex portion 191, the nut body 10 has hollow portions 10A, 10B, the dustproof sheets 190 are assembled in the hollow portions 10A, 10B, respectively, and the convex portion 191 correspondingly covers the assembling groove 15. Please refer to FIG. 2 and FIG. 3 again, the two dustproof sheets 19 are respectively assembled on the first end portion 17 and the second end portion 18 of the nut body 10. Through the hollow portions 10A, 10B arranged in the nut body 10, dust or dirt can be prevented from entering the ball nut assembly 100. Further, through that the convex portion 191 protruding from the periphery of the dustproof sheet 19 covers the assembling groove 15 correspondingly, dustproof effect for the assembling groove 15 can be achieved. In this embodiment, the two dustproof sheets 19 are assembled on the first end portion 17 and the second end portion 18, respectively, but the instant disclosure is not limited thereto; in some embodiments, and a dustproof sheet 19 may be assembled only on an end of the ball nut assembly 100 where the end component 20 is assembled.

Figure 6:
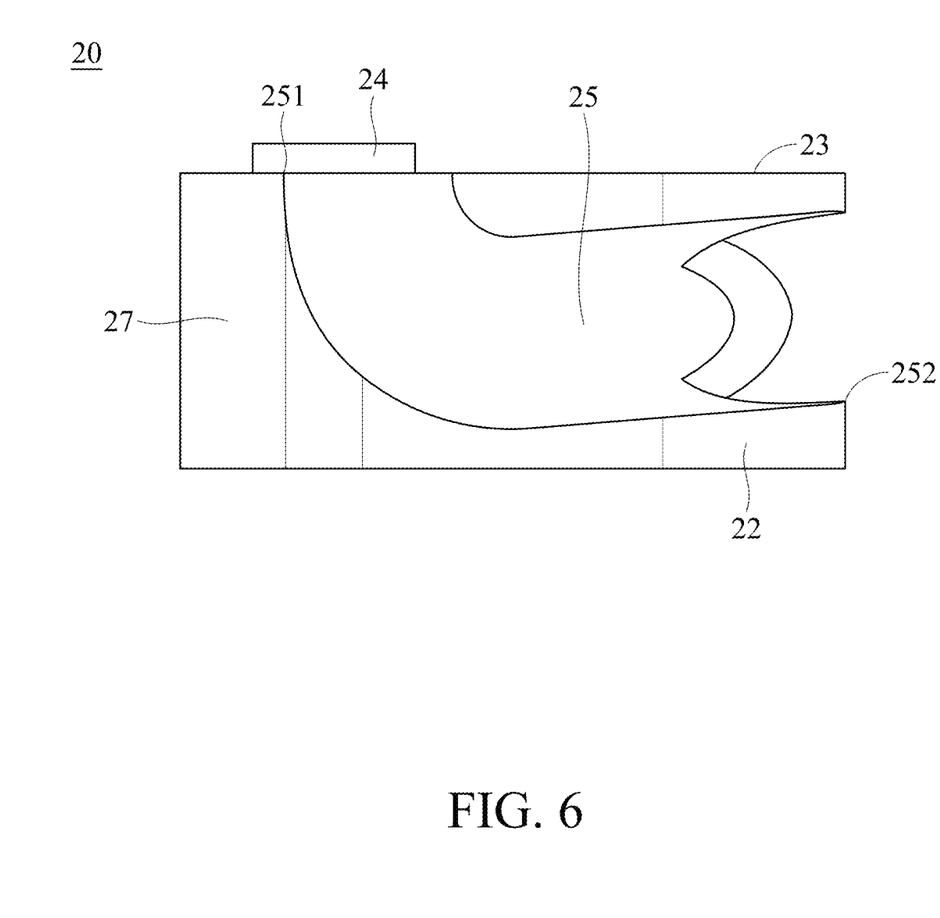
FIG. 6 illustrates a front view of an end component according to an embodiment of the instant disclosure.

Please refer to FIG. 6. FIG. 6 illustrates a front view of an end component according to an embodiment of the instant disclosure. As shown in FIG. 6, in this embodiment, the reflow bend 25 has a first end 251 and a second end 252. The first end 251 is opposite to the second end 252. A distance between the first end 251 and the second end 252 is a rollable distance of the ball 40 in the return bend 25. By shortening the distance from the first end 251 to the second end 252, issues of the clogging of the balls 40 can be reduced so as to increase the rolling smoothness of the balls 40. In this embodiment, a rollable distance from the first end 251 to the second end 252 is 2 to 3 times a diameter of one of the balls 40.

Figure 7:
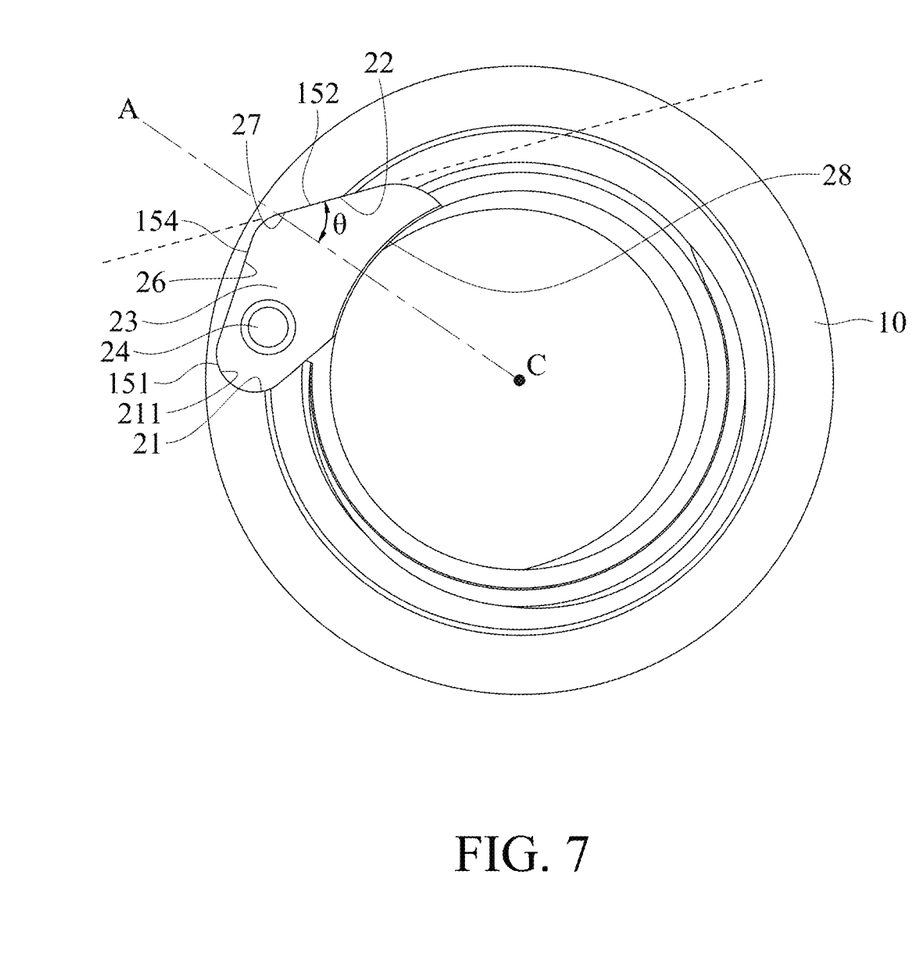
FIG. 7 illustrates a schematic view of a nut body, an end component, and a shaft according to an embodiment of the instant disclosure.

Please refer to FIG. 3, FIG. 4, FIG. 6, and FIG. 7. FIG. 7 illustrates a schematic view of a nut body, an end component, and a shaft according to an embodiment of the instant disclosure. For the sake of clarity, in FIG. 7 some components are omitted, and only the nut body 10, the end component 20, and the shaft 30 are shown. As shown in FIG. 3 and FIG. 4, the end component 20 further has an axial surface 26. The axial surface 26 axially extends and is connected to the first contact surface 21 and the second contact surface 22. The first contact surface 21 has a first fillet portion 211, and a second fillet portion 27 is between the second contact surface 22 and the axial surface 26. According to some embodiments, through the configuration of the first fillet portion 211, the impact force of the first contact surface 21 of the end component 20 against the first side surface 151 is relieved, and wear of the end component 20 and the nut body 10 is reduced. In this embodiment, a radius of the first fillet portion is 0.8 to 1.8 times a diameter of one of the balls 40. As shown in FIG. 6 and FIG. 7, the reflow bend 25 of the end component 20 is arranged on the second contact surface 22, and the reflow bend 25 has a guide angle for guiding the rolling of the balls 40 due to the inclination of the second contact surface 22. As shown in FIG. 7, a line connecting the second fillet portion 27 and an axial center C of the nut body 10 forms a reference axis A, and an angle θ between a virtual extension line of the second contact surface 22 and the reference axis A is the guide angle, the angle θ may be between 40 and 50 degrees. Here, the angle θ is, for example, 43 degrees. In addition, the end component 20 further has an arc surface 28. The arc surface 28 is opposite to the axial surface 26 and is connected to the first contact surface 21 and the second contact surface 22. Since the center of circle of the arc surface 28 corresponds to the axis center C of the nut body 10, a line connecting to the second fillet portion 27 and a center of circle of the arc surface 28 (that is, the axis center C) forms the reference axis A, and an angle θ between a virtual extension line of the second contact surface 22 and the reference axis A is also the guide angle.

What is claimed is:

1. A ball nut assembly, comprising:
   a nut body comprising an outer ring wall, an inner ring wall, a ball groove, an assembling groove, and a fixing hole, wherein the ball groove is annularly arranged on the inner ring wall; the reflow channel is axially defined through the nut body between the outer ring wall and the inner ring wall; the assembling groove is arranged on an end portion, and the assembling groove has a first side surface, a second side surface, a bottom surface, and an assembling groove wall; the first side surface and the second side surface are opposite to each other; the bottom surface is connected to the first side surface and the second side surface, and the fixing hole is on the bottom surface; the assembling groove wall is adjacent to the first side surface, the second side surface, and the bottom surface, and a surface of the assembling groove wall is flushed with a surface of the outer ring wall; and
   an end component accommodated in the assembling groove of the nut body, wherein the end component comprises a first contact surface, a second contact surface, a radial surface, a fixing portion, and a reflow bend; the first contact surface is opposite to the second contact surface; the radial surface extends radially and is connected to the first contact surface and the second contact surface; the fixing portion is arranged on the radial surface; the reflow bend is arranged on the second contact surface, and is open towards the second side surface; the first contact surface contacts the first side surface of the assembling groove in a force-fit manner; the second contact surface contacts the second side surface of the assembling groove in the force-fit manner, two ends of the reflow bend respectively correspond to the ball groove and the reflow channel, and the fixing portion is fixed in the fixing hole;

wherein the end component further comprises an axial surface extending axially and connected to the first contact surface and the second contact surface, the first contact surface has a first fillet portion, and a second fillet portion is between the second contact surface and the axial surface;

wherein the nut body has an axial center, a line connecting the second fillet portion and the axial center forms a reference axis, and an angle between a virtual extension line of the second contact surface and the reference axis is between 40 and 50 degrees.

2. The ball nut assembly according to claim 1, wherein the nut body further comprises a flange radially extending from one end of the nut body.

3. The ball nut assembly according to claim 1, further comprising a dustproof sheet, wherein the dustproof sheet has a convex portion, the nut body has a hollow portion, the dustproof sheet is assembled in the hollow portion, and the convex portion correspondingly covers the assembling groove.

4. The ball nut assembly according to claim 1, wherein a thickness between the assembling groove wall and the outer ring wall is at least 2 mm.

5. The ball nut assembly according to claim 1, further comprising a shaft inserted into the nut body.

6. The ball nut assembly according to claim 5, further comprising a plurality of balls rolling in a ball circulation channel formed by the ball groove, an outer wall of the shaft, the reflow bend, and the reflow channel.

7. The ball nut assembly according to claim 6, wherein the reflow bend has a first end and a second end, and a rollable distance from the first end to the second end is 2 to 3 times a diameter of one of the balls.

8. The ball nut assembly according to claim 6, wherein a radius of the first fillet portion is 0.8 to 1.8 times a diameter of one of the balls.

9. An end component, adapted to be assembled on a nut so as to allow a plurality of balls rolling thereon, wherein the end component comprises:
a first contact surface;
a second contact surface opposite to the first contact surface;
a radial surface radially extending and connected to the first contact surface and the second contact surface;
a fixing portion arranged on the radial surface; and
a reflow bend arranged on the second contact surface, and is open towards the second side surface;

wherein the end component further comprises an axial surface extending axially and connected to the first contact surface and the second contact surface, the first contact surface has a first fillet portion, and a second fillet portion is between the second contact surface and the axial surface;

wherein the end component further having an arc surface, the arc surface is opposite to the axial surface and connected to the first contact surface and the second contact surface; a line connecting to the second fillet portion and a center of circle of the arc surface forms a reference axis, and an angle between a virtual extension line of the second contact surface and the reference axis is between 40 and 50 degrees.

10. The end component according to claim 9, wherein the reflow bend has a first end and a second end, and a rollable distance from the first end to the second end is 2 to 3 times a diameter of one of the balls.

11. The end component according to claim 9, wherein a radius of the first fillet portion is 0.8 to 1.8 times a diameter of one of the balls.

12. A ball nut assembly, comprising:
a nut body comprising an outer ring wall, an inner ring wall, a ball groove, an assembling groove, and a fixing hole, wherein the ball groove is annularly arranged on the inner ring wall; the reflow channel is axially defined through the nut body between the outer ring wall and the inner ring wall; the assembling groove is arranged on an end portion, and the assembling groove has a first side surface, a second side surface, a bottom surface, and an assembling groove wall; the first side surface and the second side surface are opposite to each other; the bottom surface is connected to the first side surface and the second side surface, and the fixing hole is on the bottom surface; the assembling groove wall is adjacent to the first side surface, the second side surface, and the bottom surface, and a surface of the assembling groove wall is flushed with a surface of the outer ring wall; and
an end component accommodated in the assembling groove of the nut body, wherein the end component comprises a first contact surface, a second contact surface, a radial surface, a fixing portion, and a reflow bend; the first contact surface is opposite to the second contact surface; the radial surface extends radially and is connected to the first contact surface and the second contact surface; the fixing portion is arranged on the radial surface; the reflow bend is arranged on the second contact surface; the first contact surface contacts the first side surface of the assembling groove in a force-fit manner; the second contact surface contacts the second side surface of the assembling groove in the force-fit manner, two ends of the reflow bend respectively correspond to the ball groove and the reflow channel, and the reflow bend formed as a groove in the end component, the groove interconnecting the two ends of the reflow bend and an entirety of the groove being open to an exterior of the end component; the fixing portion is fixed in the fixing hole;

wherein the end component further comprises an axial surface extending axially and connected to the first contact surface and the second contact surface, the first contact surface has a first fillet portion, and a second fillet portion is between the second contact surface and the axial surface;

wherein the nut body has an axial center, a line connecting the second fillet portion and the axial center forms a reference axis, and an angle between a virtual extension line of the second contact surface and the reference axis is between 40 and 50 degrees.

* * * * *